(12) United States Patent
Iwase et al.

(10) Patent No.: US 9,721,465 B2
(45) Date of Patent: Aug. 1, 2017

(54) INFORMATION-PROVIDING SYSTEM, PORTABLE TERMINAL DEVICE, SERVER, AND PROGRAM

(75) Inventors: Hiroyuki Iwase, Hamamatsu (JP);
Shinji Koezuka, Hamamatsu (JP);
Shinya Sakurada, Hamamatsu (JP);
Mitsuru Fukui, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 159 days.

(21) Appl. No.: 13/978,494

(22) PCT Filed: Dec. 28, 2011

(86) PCT No.: PCT/JP2011/080476
§ 371 (c)(1),
(2), (4) Date: Jul. 5, 2013

(87) PCT Pub. No.: WO2012/093642
PCT Pub. Date: Jul. 12, 2012

(65) Prior Publication Data
US 2013/0279300 A1    Oct. 24, 2013

(30) Foreign Application Priority Data

Jan. 7, 2011   (JP) ................................. 2011-001765
Apr. 5, 2011   (JP) ................................. 2011-083977

(51) Int. Cl.
*G10K 11/00*       (2006.01)
*G08C 23/00*       (2006.01)
(Continued)

(52) U.S. Cl.
CPC ........... *G08C 23/00* (2013.01); *H04N 21/237* (2013.01); *H04N 21/4126* (2013.01);
(Continued)

(58) Field of Classification Search
CPC ........... G10L 19/018; G06F 2213/0038; G08C 23/00; H04M 1/6016; H04M 1/72522;
(Continued)

(56) References Cited

U.S. PATENT DOCUMENTS 6,133,912 A * 10/2000 Montero ................ G06Q 30/02
                                                     348/558
6,138,090 A * 10/2000 Inoue ...................... G10L 19/04
                                                     704/212
(Continued)

FOREIGN PATENT DOCUMENTS

CN         1575613 A      2/2005
JP         10-257401 A    9/1998
(Continued)

OTHER PUBLICATIONS

Notice of Submission of Opinion, dated Jun. 24, 2014, issued by the Korean Intellectual Property Office in corresponding Korean Patent Application No. 10-2013-7017698. English Translation provided.
(Continued)

*Primary Examiner* — Naomi Small
(74) *Attorney, Agent, or Firm* — Rossi, Kimms & McDowell LLP

(57) ABSTRACT

Provided is an information-providing system whereby a variety of information can be provided using a sound to a portable terminal device used by a user. The information-providing system includes a sound output device outputting, as a sound wave, identifying information modulated into a sound signal, an identifying-information resolution server, connected to an information-communication network, for identifying, based on the identifying information, address information for accessing a content server connected to an information-communication network; and a portable terminal device including a sound receiving section for receiving the sound wave outputted by the sound-emitting device, a
(Continued)

demodulating section for demodulating the identifying information from the received sound wave, a resolution section for sending the demodulated identifying information to the identifying-information resolution server and acquiring the address information, and an accessing section for accessing the content server using the acquired address information.

13 Claims, 11 Drawing Sheets

(51) Int. Cl.
    *H04N 21/237* (2011.01)
    *H04N 21/414* (2011.01)
    *H04N 21/422* (2011.01)
    *H04N 21/439* (2011.01)
    *H04N 21/4722* (2011.01)
    *H04N 21/858* (2011.01)
    *H04N 21/41* (2011.01)
    *H04N 21/654* (2011.01)
    *H04N 21/658* (2011.01)
    *H04M 1/725* (2006.01)
    *H04M 1/60* (2006.01)

(52) U.S. Cl.
    CPC . *H04N 21/41407* (2013.01); *H04N 21/42203* (2013.01); *H04N 21/4394* (2013.01); *H04N 21/4722* (2013.01); *H04N 21/654* (2013.01); *H04N 21/6582* (2013.01); *H04N 21/8586* (2013.01); *G06F 2213/0038* (2013.01); *H04M 1/6016* (2013.01); *H04M 1/72522* (2013.01)

(58) Field of Classification Search
    CPC ............. H04N 21/237; H04N 21/4126; H04N 21/41407; H04N 21/42203; H04N 21/4394; H04N 21/4722; H04N 21/654; H04N 21/6582; H04N 21/8586
    USPC ........................................................ 367/197
    See application file for complete search history.

(56) References Cited

U.S. PATENT DOCUMENTS

| | | | | |
|---|---|---|---|---|
| 6,505,160 | B1* | 1/2003 | Levy | G06F 17/30017 455/3.06 |
| 7,460,991 | B2 | 12/2008 | Jones et al. | |
| 2001/0055391 | A1* | 12/2001 | Jacobs | G06Q 30/0601 380/241 |
| 2002/0029389 | A1 | 3/2002 | Kimura | |
| 2002/0042777 | A1* | 4/2002 | Yoshida | G06Q 20/105 705/41 |
| 2003/0051252 | A1 | 3/2003 | Miyaoku et al. | |
| 2004/0137929 | A1* | 7/2004 | Jones | H04N 21/6582 455/517 |
| 2005/0219068 | A1 | 10/2005 | Jones et al. | |
| 2005/0252974 | A1 | 11/2005 | Mizukoshi | |
| 2006/0140162 | A1* | 6/2006 | Vasa | H04L 12/5895 370/338 |
| 2006/0239503 | A1* | 10/2006 | Petrovic | H04L 9/002 382/100 |
| 2006/0268842 | A1* | 11/2006 | Takahashi | H04L 29/1216 370/352 |
| 2007/0038463 | A1* | 2/2007 | Tischer | G06F 21/10 704/276 |
| 2008/0253740 | A1* | 10/2008 | Rhoads | G06Q 20/341 386/248 |
| 2008/0262928 | A1 | 10/2008 | Michaelis | |
| 2009/0070104 | A1 | 3/2009 | Jones et al. | |
| 2010/0053169 | A1* | 3/2010 | Cook | G06F 3/16 345/440.1 |
| 2010/0240297 | A1 | 9/2010 | Jones et al. | |
| 2011/0150240 | A1 | 6/2011 | Akiyama et al. | |
| 2011/0238192 | A1* | 9/2011 | Shah | G10L 19/018 700/94 |

FOREIGN PATENT DOCUMENTS

| | | |
|---|---|---|
| JP | 2002-41400 A | 2/2002 |
| JP | 2002207696 A | 7/2002 |
| JP | 2002209204 A | 7/2002 |
| JP | 2005-327184 A | 11/2005 |
| JP | 2006-190312 A | 7/2006 |
| JP | 2007164659 A | 6/2007 |
| JP | 2008-288638 A | 11/2008 |
| JP | 2009-27722 A | 2/2009 |
| JP | 2009182616 A | 8/2009 |
| JP | 2010525462 A | 7/2010 |
| WO | 2010016589 A1 | 2/2010 |

OTHER PUBLICATIONS

ISR Apr. 3, 2012 for PCT/JP2011/080476.
Office Action and Search Report issued in CN201180064469.6, mailed Nov. 3, 2015. English translation provided.
Japanese Office Action issued in counterpart application No. JP2011-278495, dated Aug. 18, 2015. English translation provided.
Japanese Office Action issued in counterpart application No. JP2011-278494, dated Sep. 1, 2015. English translation provided.
Office Action issued in Chinese Patent Application No. CN201180064469.6, mailed Sep. 21, 2016. English translation provided.

* cited by examiner

FIG.3
| ID | DETAILS OF CONTENTS | |
|---|---|---|
| | TITLE (PROGRAM TITLE, BRAND NAME OF CM PRODUCT) | PROVIDED SERVICE (URL) |
| 0000 | STORE INTRODUCING PROGRAM | COUPON DISTRIBUTION |
| 0001 | BROADCAST OF BASEBALL GAME | PROVIDE DETAIL INFORMATION OF BASEBALL PLAYERS |
| 0002 | TV SHOPPING | INDUCE USER TO PRODUCT PAYMENT WEB SITE |
| 0003 | QUIZ | INDUCE USER TO FREE GIFT ENTERING WEB SITE |
FIG.4A
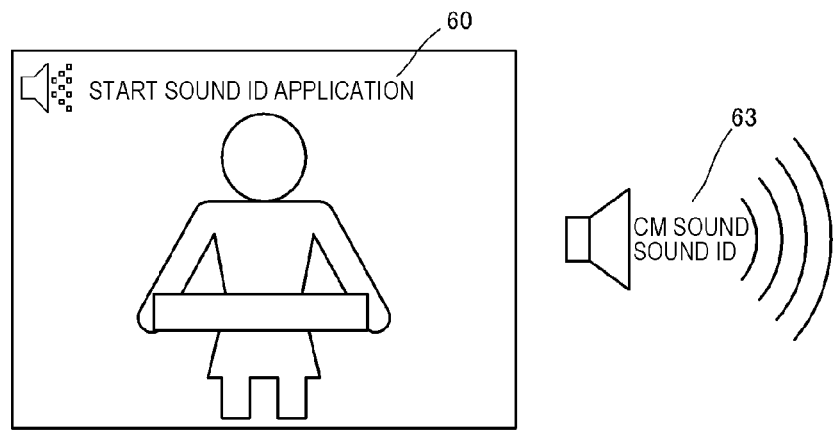
FIG.4B
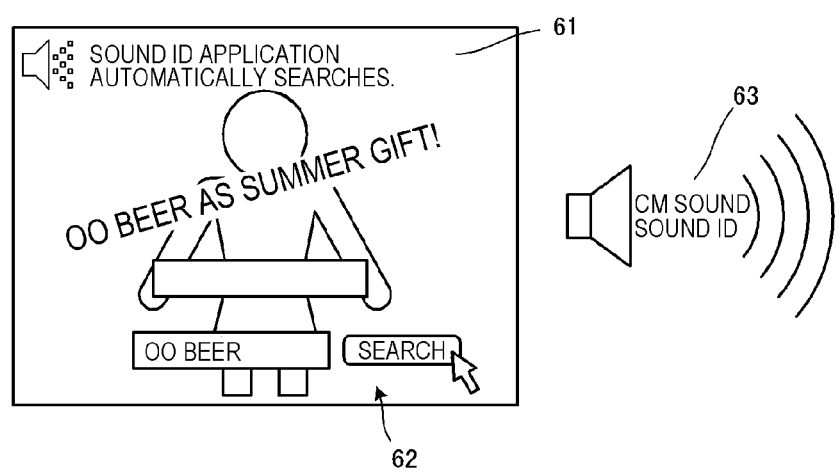

FIG. 7A

| ID | DETAILS OF CONTENTS ||| 40A |
|---|---|---|---|
| | TITLE (PROGRAM TITLE, BRAND NAME OF CM PRODUCT) | AREA | PROVIDED SERVICE (URL) |
| 0000 | STORE INTRODUCING PROGRAM | AICHI | STORE'S COUPON IN AICHI |
| 0000 | STORE INTRODUCING PROGRAM | SHIZUOKA | STORE'S COUPON IN SHIZUOKA |
| 0000 | STORE INTRODUCING PROGRAM | GIFU | STORE'S COUPON IN GIFU |
| 0000 | STORE INTRODUCING PROGRAM | MIE | STORE'S COUPON IN MIE |

FIG. 7B

| ID | DETAILS OF CONTENTS ||| 40B |
|---|---|---|---|
| | TITLE (PROGRAM TITLE, BRAND NAME OF CM PRODUCT) | TIME OF DAY | PROVIDED SERVICE (URL) |
| 0010 | STORE INTRODUCING CM | 0 TO 10 | NO SERVICE |
| 0010 | STORE INTRODUCING CM | 10 TO 14 | DISCOUNT COUPON FOR LUNCH |
| 0010 | STORE INTRODUCING CM | 16 TO 18 | DISCOUNT COUPON FOR MEAT |
| 0010 | STORE INTRODUCING CM | 18 TO 20 | COUPON FOR UNSOLD GOODS |

| ID | PORTAL URL OF CONTENT SERVER | 140 |
|---|---|---|
| 0000 | URL SERVER 1 | |
| 0001 | URL SERVER 2 | |
| 0002 | URL SERVER 3 | |
| 0003 | URL SERVER 4 | |

| ID | DETAILS OF CONTENTS | | |
|---|---|---|---|
| | TITLE (PROGRAM TITLE, BRAND NAME OF CM PRODUCT) | CONTENT TYPE | URL OF CONTENT |
| 0000 | STORE INTRODUCING PROGRAM | COUPON | URL OF COUPON IMAGE |
| 0001 | BROADCAST OF BASEBALL GAME | INFORMATION | URL OF DETAILED INFORMATION ABOUT BASEBALL PLAYERS |

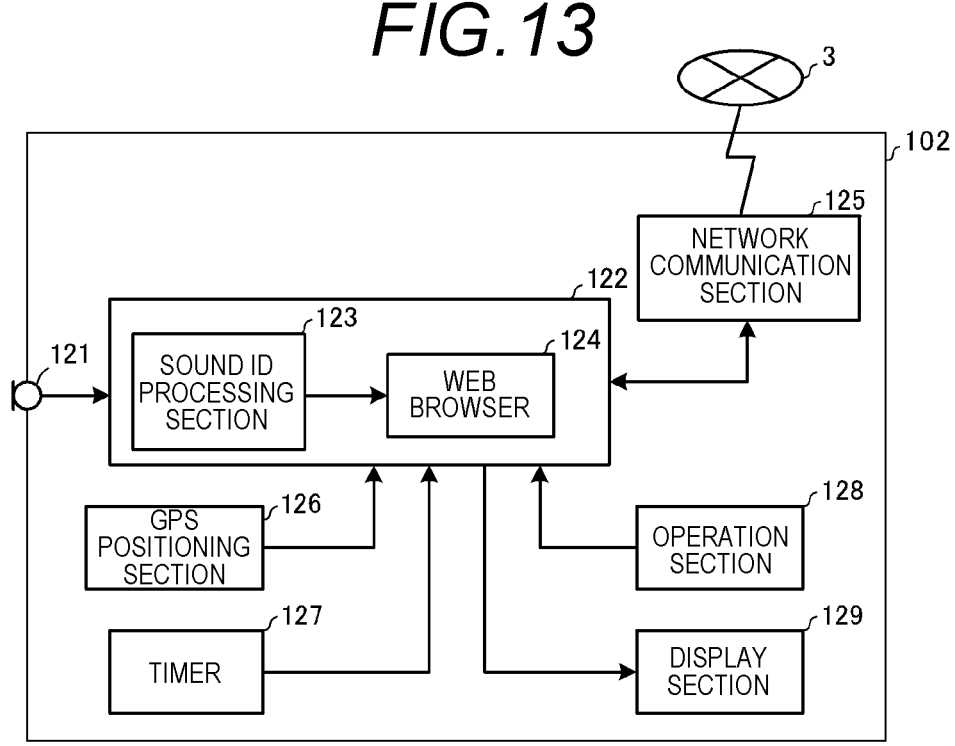

FIG.15A

| ID | PROGRAM TITLE | CONTENT TYPE | AREA | CONTENT URL |
|---|---|---|---|---|
| 0000 | STORE INTRODUCING PROGRAM | COUPON | AICHI | COUPON URL OF STORE IN AICHI |
| 0000 | STORE INTRODUCING PROGRAM | COUPON | SHIZUOKA | COUPON URL OF STORE IN SHIZUOKA |
| 0000 | STORE INTRODUCING PROGRAM | COUPON | GIFU | COUPON URL OF STORE IN GIFU |
| 0000 | STORE INTRODUCING PROGRAM | COUPON | MIE | COUPON URL OF STORE IN MIE |

FIG.15B

| ID | PROGRAM TITLE | CONTENT TYPE | TIME OF DAY | CONTENT URL |
|---|---|---|---|---|
| 0000 | LONG TIME PROGRAM | STAMP RALLY | 11:30-13:30 | URL OF STAMP 1 |
| 0000 | LONG TIME PROGRAM | STAMP RALLY | 13:30-15:30 | URL OF STAMP 2 |
| 0000 | LONG TIME PROGRAM | STAMP RALLY | 15:30-17:30 | URL OF STAMP 3 |
| 0000 | LONG TIME PROGRAM | STAMP RALLY | 17:30-19:30 | URL OF STAMP 4 |

INFORMATION-PROVIDING SYSTEM, PORTABLE TERMINAL DEVICE, SERVER, AND PROGRAM

This application is a U. S. National Phase Application of PCT International Application PCT/JP2011/080476 filed on Dec. 28, 2011 which is based on and claims priority from JP 2011-001765 filed on Jan. 7, 2011 and JP 2011-083977 filed Apr. 5, 2011 the contents of which are hereby incorporated by reference.

TECHNICAL FIELD

The present invention relates to an information-providing system capable of providing a variety of information using a sound (sound wave), and a portable terminal device, a server, and a program which are for use in the system.

BACKGROUND ART

As a system for providing information together with a sound, a data broadcast has been put to practical use which superposes data on a video/sound broadcast, for example, in television broadcasting, to provide a variety of information in response to a remote control operation of a television.

CITATION LIST

Patent Literature

Patent Literature 1: JP-A-2008-288638

SUMMARY OF INVENTION

Technical Problem

However, the data broadcast is prepared for merely displaying the information on a television screen, but is not possible to be utilized for a user to carry the information in other places, for example, as a coupon. Further, the data broadcast cannot transmit the information to a cell phone or a smart phone by which the user is habituated to use as a tool to acquire information.

An object of the present invention is to provide an information-providing system capable of providing a variety of information using a sound (sound wave) to a portable terminal device used by a user, and a portable terminal device, a server, and a program which are for use in the system.

Solution to Problem

An information-providing system provided according to a first aspect of the present invention includes: a sound output device adapted to output, as a sound wave, identifying information which is modulated into a sound signal; an identifying-information resolution server connected to an information-communication network, and adapted to identify address information for accessing a content server which is connected to the information-communication network, based on the identifying information; and a portable terminal device that includes a sound receiving section adapted to receive the sound wave outputted from the sound output device, a demodulating section adapted to demodulate the identifying information from the received sound wave, a resolution section adapted to send the demodulated identifying information to the identifying-information resolution server to acquire the address information, and an access section adapted to access the content server using the address information acquired.

In addition, the sound wave includes a general idea of all elastic waves capable of being propagated through an elastic body irrespective of air, liquid and solid, as well as the elastic wave capable of being propagated through the air.

The first aspect may be configured so that the portable terminal device further includes a position acquiring section adapted to acquire position information which indicates a position of the portable terminal device, the identifying-information resolution server is configured to identify the address information based on the identifying information and the position information sent from the portable terminal device, and the resolution section of the portable terminal device sends the identifying information demodulated by the demodulation section and the position information acquired by the position acquiring section to the identifying-information resolution server to acquire the address information.

The first aspect may be configured so that the portable terminal device further includes a time acquiring section adapted to acquire time information, wherein the time information indicates a time when the sound receiving section receives the sound wave outputted by the sound output device, or a time when the identifying information is sent to the identifying-information resolution server, the identifying-information resolution server is a server adapted to identify the address information based on the identifying information and the time information sent from the portable terminal device, and the resolution section of the portable terminal device sends the demodulated identifying information and the time information acquired by the time acquiring section to the identifying-information resolution server to acquire the address information.

The first aspect may be configured so that the sound output device is a broadcast receiving device, the sound wave outputted from the sound output device includes a sound sent from a broadcasting station, the sound being a sound of a program or advertisement of a broadcast, and the identifying information resolution server identifies the address information for accessing the content server having a content about the program or advertisement of the broadcast based on the received identifying information.

The first aspect may be configured so that the sound output device includes a speaker device installed inside, outside or in a vicinity of a facility, and the identifying-information resolution server identifies the address information for accessing the content server having a content about the facility based on the received identifying information.

A portable terminal device provided according to a second aspect of the present invention includes: a sound receiving section adapted to receive a sound wave of identifying information which is modulated into a sound signal; a demodulating section adapted to demodulate the identifying information from the received sound wave; a resolution section adapted to send the demodulated identifying information to an identifying-information resolution server via an information-communication network to acquire address information of a content server connected to the information-communication network; and an access section adapted to access the content server via the information-communication network using the address information acquired.

A server capable of resolving identifying information provided according to a third aspect of the present invention includes: a receiving section adapted to communicate with a portable terminal device, which demodulates the identifying information from a received sound wave, via an information-communication network, and to receive the identifying information from the portable terminal device; and a resolution section adapted to identify address information for accessing a content server connected to the information-communication network based on the received identifying information.

A program provided according to a fourth aspect of the present invention causes a computer to function as: demodulation means tor demodulating identifying information from a received sound wave; identifying-information resolution means for sending the demodulated identifying information to an identifying-information resolution server via a information-communication network to acquire address information of a content server connected to the information-communication network; and network access means for accessing the content server via the information-communication network using the address information acquired.

An information-providing system according to the fifth aspect of the present invention includes a sound output device adapted to output, as a sound wave, identifying information which is modulated into a sound signal; an identifying-information resolution server to an information-communication network, and adapted to identify first address information for accessing a distribution server which is connected to the information-communication network, based on the identifying information; the distribution server connected to the information-communication network, identified by the first address information, and adapted to identify second address information for accessing a content server, having a desired content, which is connected to the information communication network, based on the first address information and a portable terminal device that includes a sound receiving section adapted to receive the sound wave outputted from the sound output device, a demodulating section adapted to demodulate the identifying information from the received sound wave, a network communication section adapted to communicate via the information-communication network, and a control section adapted to send the demodulated identifying information to the identifying-information resolution server to acquire the first address information, to access the distribution server to acquire the first address information, to send the identifying information to the distribution server to acquire the second address information, and to access the content server using the second address information acquired.

The fifth aspect may be configured so that the identifying-information resolution server associates one first address information with pieces of identifying information, and the distribution server which is accessed with the one first address information associates different pieces of second address information with the pieces of identifying information.

The fifth aspect may be configured so that the distribution server and the content server which is accessed, with the second address information identified by the distribution server are configured by a common server.

The fifth aspect may be configured so that the sound output device is a broadcast receiving device, the sound wave outputted from the sound output device includes a sound sent from a broadcasting station, the sound being a sound of a program or advertisement of a broadcast, and the distribution server identifies the second address information for accessing the content server having a content about the program or advertisement of the broadcast based on the received identifying information.

The fifth aspect may be configured so that the sound output device includes a speaker device installed inside, outside or in a vicinity of a facility, and the distribution server identifies the second address information for accessing the content server having a content about the facility based on the received identifying information.

The fifth aspect may be configured so that the portable terminal device further includes a position acquiring section adapted to acquire position information which indicates a position of the portable terminal device, the distribution server is configured to identify the second address information based on the identifying information and the position information sent from the portable terminal device, and the control section of the portable terminal device sends the identifying information and the position information acquired by the position acquiring section to the distribution server to acquire the second address information.

The fifth aspect may be configured so that the portable terminal device further includes a time acquiring section adapted to acquire time information, wherein the time information indicates a time when the sound receiving section receives the sound wave outputted by the sound output device, or a time when the identifying information is sent to the distribution server, the distribution server is configured to identify the second address information based on the identifying information and the time information sent from the portable terminal device, and the control section of the portable terminal device sends the identifying information and the time information acquired by the time acquiring section to the distribution server to acquire the second address information.

A portable terminal device provided according to a sixth aspect of the present invention includes: a sound receiving section adapted to receive a sound wave of identifying information which is modulated into a sound signal; a demodulating section adapted to demodulate the identifying information from the received sound wave; a network communication section adapted to communicate via a information-communication network; and a control section adapted to send the demodulated identifying information to an identifying-information resolution server via the information-communication network to acquire first address information, to access a distribution server via the information-communication network using the first address information acquired, to send the identifying information to the distribution server to acquire second address information, and to access a content server having a desired content via the information-communication network using the second address information acquired.

A server capable of resolving identifying information provided according to a seventh aspect of the present invention includes: a receiving section adapted to communicate with a portable terminal device, which demodulates the identifying information from a received sound wave, via an information-communication network, and to receive the identifying information from the portable terminal device; and a resolution section adapted to identify first address information for accessing a distribution server connected to the information-communication network based on the received identifying information.

A server for distribution provided according to an eighth aspect of the present invention includes: a receiving section adapted to communicate with a portable terminal device, which demodulates identifying information from a received sound wave, via an information-communication network, and to receive the identifying information from the portable terminal device; and a distribution section adapted to identify second address information for accessing a content server having a desired content and being connected to the information-communication network based on the received identifying information.

A program provided according to a ninth aspect of the present invention causes a computer to function as: means for sending identifying information which is demodulated from a received sound wave to an identifying information resolution server to acquire first address information; means for accessing a distribution server using the first address information acquired, and sending the identifying information to the distribution server; and means for accessing a content server having a desired content using the second address information acquired.

Advantageous Effects of Invention

According to the present invention, since the identifying information is superposed with the sound (sound wave), the portable terminal device of the user can access a desired content or content server, so that push-type information supply using the sound wave is possible.

BRIEF DESCRIPTION OF DRAWINGS

FIG. 3 is a diagram illustrating an example of an ID/URL association table of an ID resolution server according to the first embodiment.

FIG. 4A is a diagram illustrating a first example of the information-providing system applied to a television CM.

FIG. 4B is a diagram illustrating a second example of the information-providing system applied to a television CM.

FIG. 7A is a diagram illustrating a first alternative example of the ID/URL association table of the ID resolution server according to the first embodiment.

FIG. 7B is a diagram illustrating a second alternative example of the ID/URL association table of the ID resolution server according to the first embodiment.

FIG. 13 is a partial block diagram illustrating a portable terminal device according to the second embodiment.

FIG. 15A is a diagram illustrating a first alternative example of the ID/content association table according to the second embodiment.

FIG. 15B is a diagram illustrating a second alternative example of the ID/content association table according to the second embodiment.

DESCRIPTION OF EMBODIMENTS

First Embodiment

Figure 1:
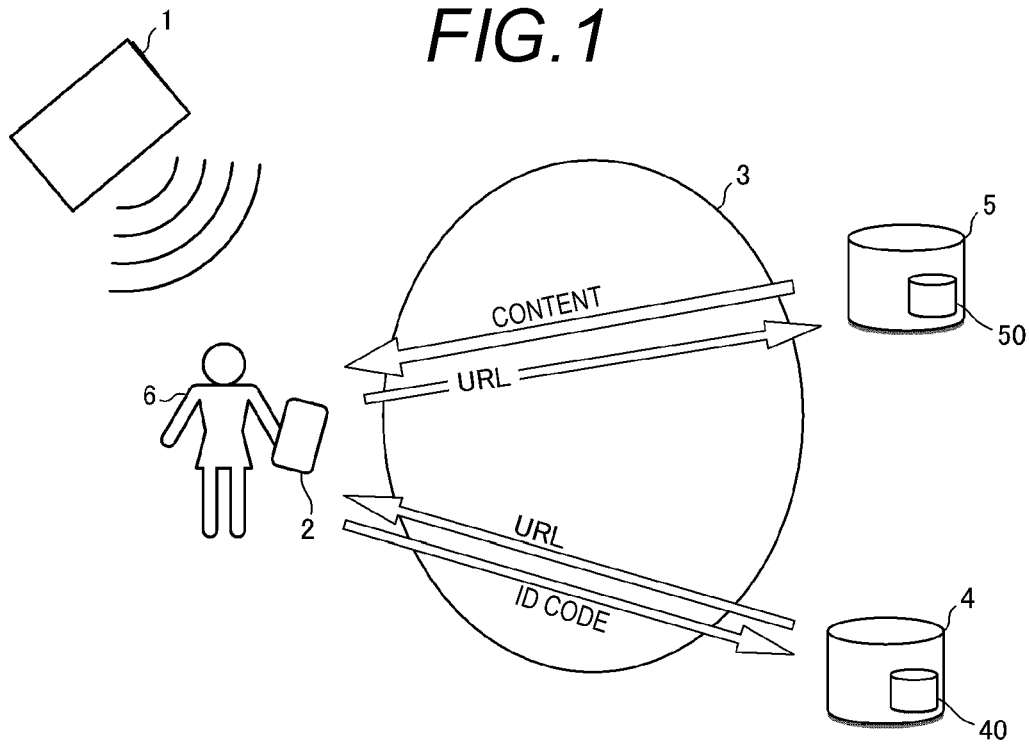
FIG. 1 is a block diagram illustrating an information-providing system according to a first embodiment of the present invention.

An information-providing system according to a first embodiment of the present invention will now be described with reference to the accompanying drawings. FIG. 1 is a diagram illustrating the configuration of the information-providing system according to the first embodiment.

The information-providing system according to the first embodiment includes a television (TV) 1, which corresponds to a sound output device, configured to output a sound wave, with which an ID code (sound ID) corresponding to identification information is superposed, and a portable terminal device 2 configured to access a specific internet site (URL) using the ID code to acquire information. In this instance, a smart phone is suitable as the portable terminal device 2.

The television 1 receives a television broadcast to display an image, and also outputs the sound wave of which a sound signal, such as music or narration, is converted into an elastic wave. The sound ID which is the ID code converted into a signal of audio band by modulation is superposed with the sound wave of the television broadcast. The content of the sound ID and the superposing method thereof will be described later. The portable terminal device 2 receives the sound wave superposed with the sound ID. The portable terminal device 2 is carried by a user 6. The portable terminal device 2 is installed with a sound ID application program 200 which is used for the information-providing system. The sound ID application program 200 is application software for separating and demodulating the received sound wave from the sound ID, and sending the ID code obtained from the sound ID to the ID resolution server 4 to convert it into an URL of the content server 5. The sound ID application program 200 cooperates with a control section of the portable terminal device 2, which constitutes a sound ID processing section 22. The concrete operation of the sound ID processing section 22 will be described with reference to the flowchart of FIG. 6. In this instance, the sound ID application program 200 may be constantly run, or may be properly started, if necessary.

The portable terminal device 2 demodulates the sound ID, which is contained in the sound wave received by a microphone, into the ID code by the sound ID processing section 22, and sends the demodulated ID code to the ID resolution server 4 via an information-communication network 3. The ID resolution server 4 includes an ID/URL association table 40 to search the ID/URL association table 40 using the received ID code, and reads the corresponding URL to reply to the portable terminal device 2. When the control section of the portable terminal device 2 receives the URL from the ID resolution server 4, a Web browser program 201 which is a standard application program of the portable terminal device 2 starts up, which constitutes a Web browser 25, and then the received URL is seat to the Web browser 25. The Web browser 25 accesses the content server 5 designated by the received URL, and displays the Web page designated by the URL. The Web page designated by the URL is, for example, a Web page regarding to a company or a product of a commercial message (CM) which is currently televised on the television 1.

In this instance, one ID resolution server 4 is preferable, but the content server 5 may be separately provided for each company that displays a content. Also, the information communication network 3 is a communication network, such as a mobile communication network, a gateway, or Internet. Further, the information-communication network 3 may not be a single communication network, but a plurality of communication networks with different communication schemes may be connected to each other.

In the above configuration according to the first embodiment, the ID resolution server 4 corresponds to an identification information resolution server. The URL of the content server 5 corresponds to the address information.

Figure 2:
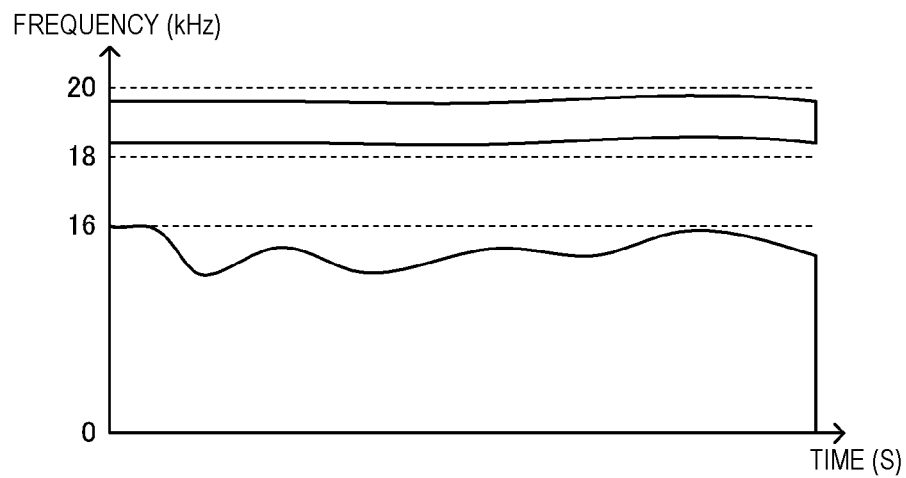
FIG. 2 is a graph illustrating an example of a superposing method of a sound ID.

Herein, the sound ID is converted into a sound signal of a high frequency band among frequency bands which can be output from the speaker device of the television 1, and then is superposed with the sound signal of the program or CM. As illustrated in FIG. 2, the maximum frequency of the sound signal used for the program or CM of the television broadcast is about 16 kHz. The sound ID is superposed with a band which is equal to or more than the maximum frequency and which is an operating frequency band of the speaker device or an audio circuit of the television 1, for example, with a band of 18 kHz to 20 kHz.

Various methods can be employed as the method of converting the ID code into the sound ID, and superposing the sound ID on the sound signal of the program or CM, but a technique of spreading the sound ID to a spread code, and converting a frequency into a signal which is shifted to a high band (frequency band of 18 to 20 kHz) is suitable, as described in detail in the international patent application (WO2010/016589) assigned to the applicant/assignee.

In the television broadcast, the information-providing system is used as the following application, for example. Coupons for a product of the CM, a product associated with the program or the like are dispensed, or users are induced to a page on which a company/product of the CM or a product/information associated with the program is published. Herein, the product/information associated with the program is information about, for example, a brand-name product, such as clothes worn by a character appeared in a program, or a tourist attraction, or a shop (restaurant or hotel) visited in the program.

Further, the information-providing system can be applied to a system of inducing a user to a page which provides detailed information about appeared players during a sport program. In addition, the information-providing system can induce a user to a page by which the user can order or pay the product introduced during a TV shopping program, or can induce a user to a page by which the user takes a customer survey on the program or product or enters for an event or quiz.

In this way, the sound wave outputted from the television 1 is appropriately superposed with the sound ID corresponding to the service content to be provided in cooperation with the content of the program or CM. The sound ID is resolved by the URL providing the desired service content, as described below. Accordingly if the user watches the television broadcast using the portable terminal device 2 carried by the user, the information-providing system can provide the user with a push-type service which induces the user to a specific Web page, without any complicated manipulation of the user.

Since the ID code having a data length shorter than a data length of the URL is associated with the URL of the content server, the portable terminal device 2 of the user can be induced by the URL having the long data length even in the data transmission by the sound wave having a low transmission rate. Further, since the ID code having a short data length is repeatedly sent, even though the demodulation is not possible due to generation of noise, the ID code is again received after the noise is reduced, so that the content is normally displayed. Therefore, the user can be reliably induced to the Web page.

To resolve the sound ID by the above-described URL, the ID resolution server 4 is provided with an ID/URL association table 40, as illustrated in FIG. 3. The ID/URL association table 40 is memorized with IDs, program titles (or brand names of CM products), and provided services (URLs) which are associated with each other.

FIGS. 4A and 4B are diagrams illustrating examples of the information-providing system applied to the television CM. A broadcasting company broadcasts a television CM including an image shown in FIGS. 4A and 4B, and a CM sound superposed with the sound ID. When the television 1 receives the television CM, the image is displayed on a screen, as illustrated in FIGS. 4A and 4B, and the CM sound (sound wave) 63 superposed with the sound ID is output from the speaker device. The sound ID induces the user to the URL (content URL) introducing the product advertised by the CM. Further, FIG. 4A is an image displayed in the first half of the CM, while FIG. 4B is an image displayed in the second half of the CM.

In the first half of the CM, as illustrated in FIG. 4A, a wording 60 urging the user to start the sound ID application program (sound ID application) 200 is displayed on the screen. The user 6 starts the sound ID application program 200 by manipulating the portable terminal device 2, if necessary. If the sound ID application program 200 has been already started, or is automatically started, the manipulation of the user 6 is not necessary. Concurrently with the screen display, the CM sound 63 superposed with the sound ID is output from the speaker device. The portable terminal device 2 with the sound ID application program 200 started (i.e., including the sound ID processing section 22) receives the sound ID outputted, and demodulates it into the ID code to start the above-described access. In the second half of the CM, as illustrated in FIG. 4B, an image urging the user to search via Internet is displayed together with a search word. However, as described above, since the portable terminal device 2 with the sound ID application program 200 started reaches content URL even though the user 6 does not input the search word, a wording 61, such as "sound ID application program is automatically searching", is displayed on the screen.

In this instance, the URL searched by inputting the search worst in a search site of Internet, and the content URL searched in the ID/URL association table 40 may be identical to each other, or may not be. The site (content URL) induced by the sound ID may be a specific site which is not searched by the search site.

FIGS. 4A and 4B show the system in which the ID code is output in synchronism with the television CM, and the portable terminal device 2 receives the ID code to automatically access the content URL, but the ID code outputted in synchronism with the television CM can be transmitted in any manner different from the method (sound ID) in which it is superposed with the sound wave outputted from the speaker device. For example, if the television 1 has a transmission function such as Bluetooth (registered trademark), Wi-Fi, or infrared rays, it can transmit the ID code using these functions. In this instance, the portable terminal device 2 is installed with an application program receiving the ID code using the Bluetooth (registered trademark), the Wi-Fi, or the infrared rays in response to the transmission method of the television 1.

Figure 5:
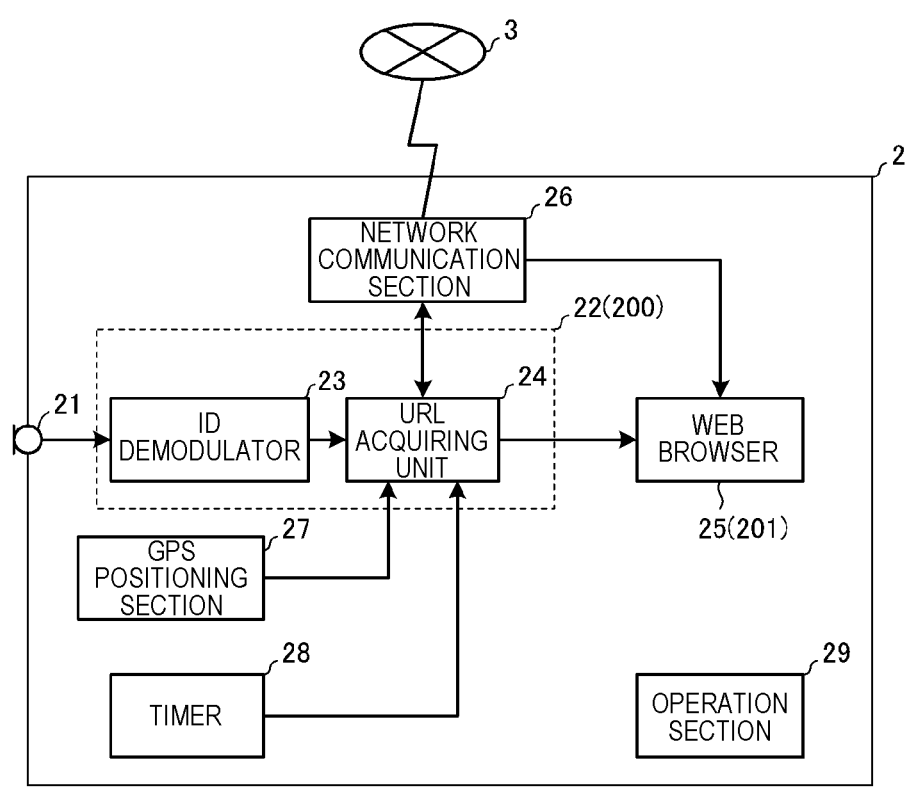
FIG. 5 is a partial block diagram illustrating a portable terminal device according to the first embodiment.

FIG. 5 is a functional block diagram of which only portions associated with the first embodiment are extracted from the portable terminal device 2. The portable terminal device (smart phone) 2 includes a microphone 21, the sound ID processing section 22, the Web browser 25, a network communication section 26, a GPS positioning section 27, a timer 28, and an operation, section 29. The microphone 21 receives the sound wave outputted from the speaker device of the television 1, and converts it into a sound signal of an electric signal. The network communication section 26 is a function block for communicating with the ID resolution section 4 or the content server 5 via the information-communication network 3.

The sound ID processing section 22 is realized by cooperation of the sound ID application program 200 and the control section, and includes an ID demodulator 23 and a URL acquiring unit 24. The ID demodulator 23 is a processing block for demodulating the ID code by passing the sound signal obtained from the microphone 21, which receives the sound, through a matched filter of which a coefficient is the diffusion code used for the diffusion modulation. The demodulation process of the ID code is described in detail in the pamphlet of International Publication No. 2010/016589. The URL acquiring unit 24 is a function block for communicating with the ID resolution server 4 by controlling the network communication section 26, and sending the ID code demodulated by the ID demodulator 23 to acquire a URL of a desired Web site. The Web browser 25 accesses the URL acquired by the URL acquiring unit 24, and then displays the Web page. In this instance, the Web browser 25 is realized by cooperation of the Web browser program 201 and the control section. Further, the URL acquiring unit corresponds to the resolution section, and the Web browser 25 and the network communication section 26 correspond to the access section.

The GPS positioning section (position acquiring section) 27 determines a position of itself (portable terminal device 2) using GPS, and inputs the position information about the determined position into the URL acquiring unit 24. Further, the timer (time acquiring section) 28 measures a time when the sound wave including the sound ID is received, or when it communicates with the ID resolution server 4, and inputs the time information about the measured time into the URL acquiring unit 24. The GPS positioning section 27 and the timer 28 are used in a modification, which will be described later. Further, the operation section 29 is, for example, a touch panel or a keypad, and detects an operation of the user 6, such as allowance for communication with the information-communication network 3.

Figure 6:
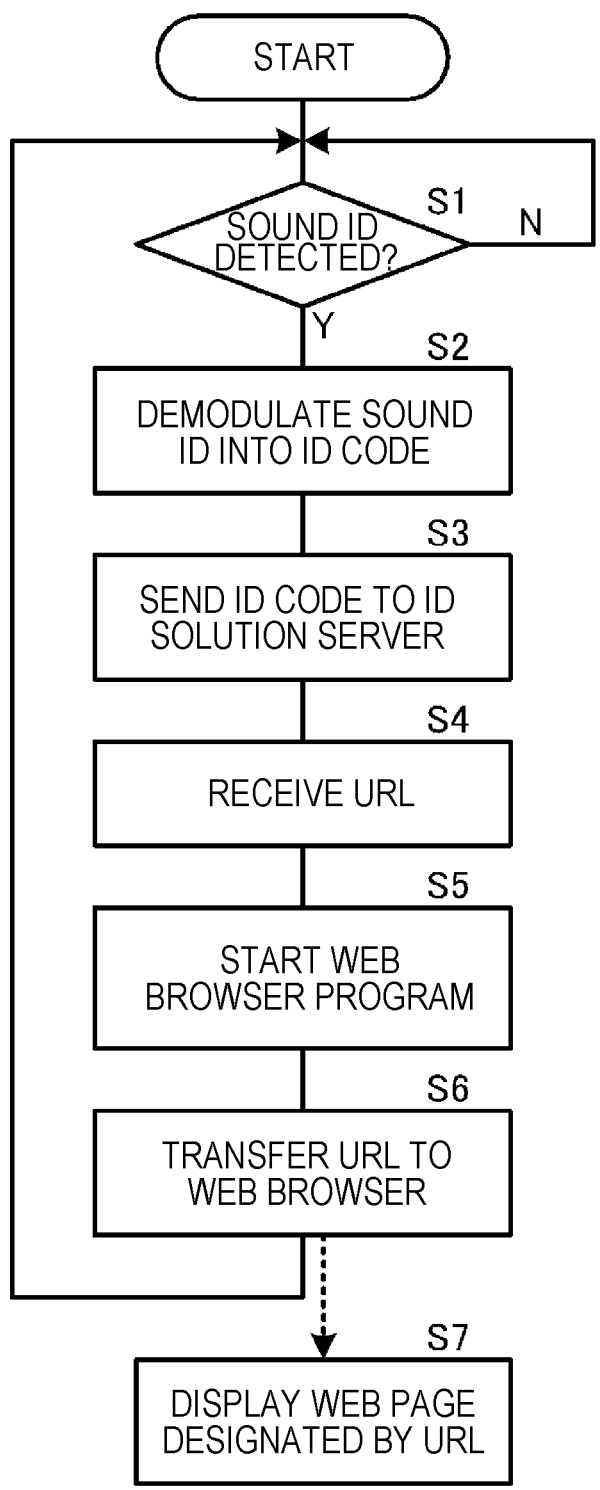
FIG. 6 is a flowchart illustrating an operation of the portable terminal device according to the first embodiment.

FIG. 6 is a flowchart illustrating the operation of the sound ID processing section 22 of the portable terminal device 2 according to the first embodiment. The sound ID processing section 22 is on standby while the sound ID is not detected (NO in step S1). If the sound ID is detected (YES in step S1), the sound ID processing section 22 demodulates it into the ID code (step S2), and automatically sends the demodulated ID code to the ID resolution server 4 (step S3). The ID resolution server 4 reads the URL corresponding to the received ID code, and replies to the portable terminal device 2 with the read URL. If the portable terminal device 2 receives the URL in step S1, the Web browser program 201 of the portable terminal device 2 is started (step S5), and the received URL is sent to the Web browser 25 (step S6), so that it accesses the content server 5 designated by the URL to display the Web page (step S7). Accordingly, the user 6 can acquire a variety of information or a coupon.

The flowchart in FIG. 6 includes the process of automatically accessing the desired URL to display the Web page when the sound ID is detected, but it may include a process of obtaining a permission of the user 6 and accessing the content server 5 when the access permission is obtained by the user 6. In this instance, the permission of the user 6 may be requested at any one or both prior to step S3 and step S5.

Although it is illustrated the example in which the sound ID outputted from the television 1 corresponds to the URL by one-to-one, one sound ID can correspond to plural contents. In this instance, the URL corresponding to one ID can be distributed based on the position of the portable terminal device 2 that has received the sound ID, or the received time.

FIGS. 7A and 7B are diagrams illustrating examples of the ID/URL association table in the case where one sound ID corresponds to plural URLs. FIG. 7A shows an example of an ID/URL association table 40A which associates one ID "0000" with four URLs based on the position information. The position information is sent together with the ID code from the portable terminal device 2 to the ID resolution server 4. The portable terminal device 2 can correctly determine the position of the portable terminal device 2 by the GPS positioning section 27. The ID resolution server 4 determines that the portable terminal device 2 is positioned in any area, based on the position information received from the portable terminal device 2, and sends the URL of the coupon according to the area.

In this instance, the position information can be acquired by a method different from the positioning by the GPS positioning section 27. For example, the position of the access point where the portable terminal device 2 accesses the information-communication network 3 can be acquired by the ID resolution server 4, and then it can be used as the position information. Further, different ID resolution server 4 can access every access area, and then the ID resolution server 4 of each access area can connect the ID with the URL independently.

In addition, FIG. 7B shows an example of an ID/URL association table 40B which associates one ID "0010" with four URLs based on a time of day. The time information may be sent from the portable terminal device 2 to the ID resolution server 4, and the time when the ID resolution server 4 receives the sound ID from the portable terminal device 2 may be used as the time information. If the time information is sent to the ID resolution server 4 from the portable terminal device 2, the sending time may be used as the time information, or the time when the sound ID is received from the television 1 (sound output device) may be used as the time information. The ID resolution server 4 determines that the time information belongs to any time of day, and then sends the URL of the coupon according to the time of day.

In the above-described embodiment, the ID resolution server 4 is configured to directly reply to the URL of the Web page (content server 5) displaying the contents or the coupon, but may be configured to reply the URL (portal URL) of the portal site in winch more detailed distribution is able. For example, the ID resolution server 4 may reply to the portal URL of the content server 5 in response to the reception of the ID, and the portable terminal device 2 may access the portal URL to again send the ID, thereby acquiring the URL which reaches the desired contents. In this instance, the portal URL is not an URL of the Web service, but is an URL (telnet or the like) of an access distribution processing resource. Accordingly, more subdivided contents can be provided. In this instance, the server for providing the access distribution processing resource may be separated from the content server 5, so that it may be used as a separate server.

Second Embodiment

Figure 10:
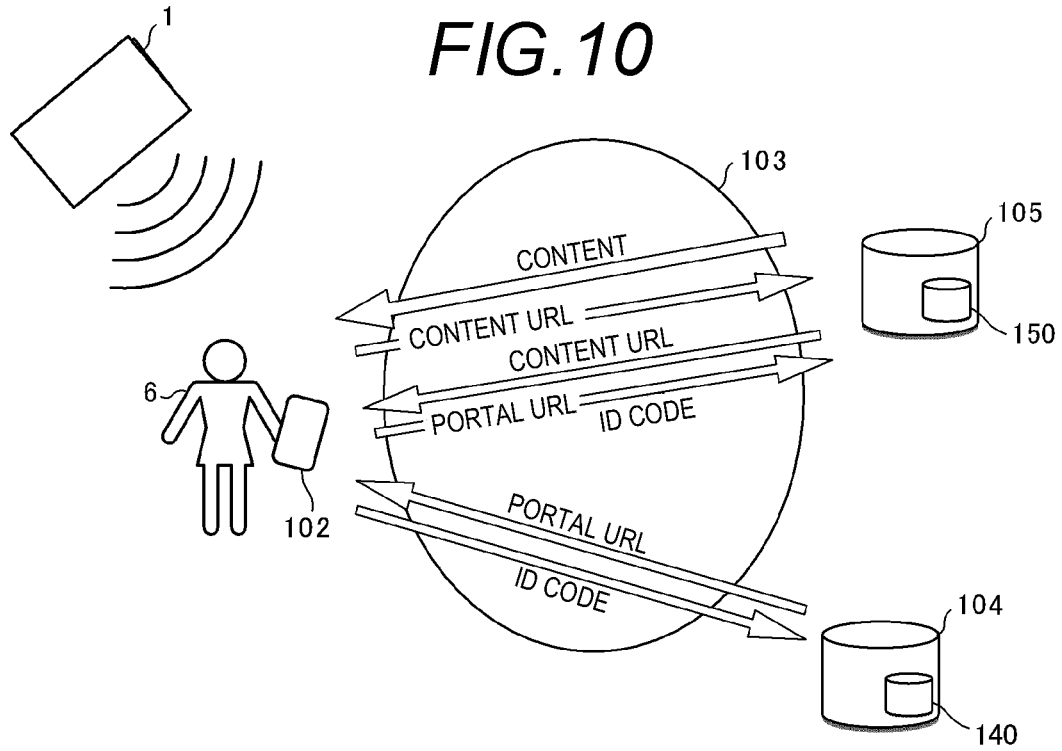
FIG. 10 is a block diagram illustrating an information-providing system according to a second embodiment of the present invention.

An information-providing system, according to a second embodiment of the present invention will now be described with reference to the accompanying drawings. FIG. 10 is a diagram illustrating the configuration of the information-providing system according to the second embodiment. In this instance, the same configuration or function as that of the first embodiment will be indicated by the same reference numeral, and its detailed description will be omitted.

The information-providing system according to the second embodiment includes the television (TV) 1, which, corresponds to a sound output device, configured to output a sound wave, with which an ID code (sound ID) corresponding to identification information is superimposed, and a portable terminal device 102 configured to access a specific internet site (URL) using the ID code to acquire information. In this instance, a smart phone is suitable as the portable terminal device 102.

The television 1 receives a television broadcast to display an image, and also outputs the sound wave of which a sound signal such as music or narration is converted into an elastic wave. The sound ID which is the ID code converted into a signal of audio band by modulation is superposed with the sound wave of the television broadcast. The content of the sound ID and the superposing method thereof will be described later. The portable terminal device 102 receives the sound wave superposed with the sound ID. The portable terminal device 102 is carried by a user 6. The portable terminal device 102 is installed with a sound ID application program which is used as the information-providing system. The sound ID application program is application, software for separating and demodulating the received sound wave from the sound ID, and sending the ID code obtained from the sound ID to the ID resolution server 104 to convert it into URL of the content server 105. The sound ID application program cooperates with a control section 122 of the portable terminal device 102, which constitutes a sound ID processing section 123. The concrete operation of the sound ID processing section 123 will be described with reference to the flowchart of FIG. 14. In this instance, the sound ID application program may be constantly run, or may be properly started, if necessary.

The portable terminal device 102 demodulates the sound ID, which is contained in the sound wave received by a microphone, into the ID code by the sound ID processing section 123, and sends the demodulated ID code to the ID resolution server 104 via an information-communication network 103. The ID resolution server 104 includes an ID/URL association table 140 to search the ID/URL association table 140 using the received ID code, and reads the corresponding portal URL (first address information) to reply to the portable terminal device 102. The portal URL exists in the content server 105. However, the portal URL is not the URL of the Web service, but an URL (telnet or the like) of the access distribution processing resource.

When the portable terminal device 102 accesses the portal URL via the information-communication network 103, and then again sends the ID code to acquire an URL (second address information) reaching the desired contents. The portable terminal device 102 accesses the acquired URL via the information-communication network 103 to acquire the desired contents. In addition to the ID resolution server 104, the distribution of the URL based on the ID can be again perforated in the portal URL of the content server 105, thereby providing the content subdivided by the content server 105.

Figures 11, 12A, 12B:
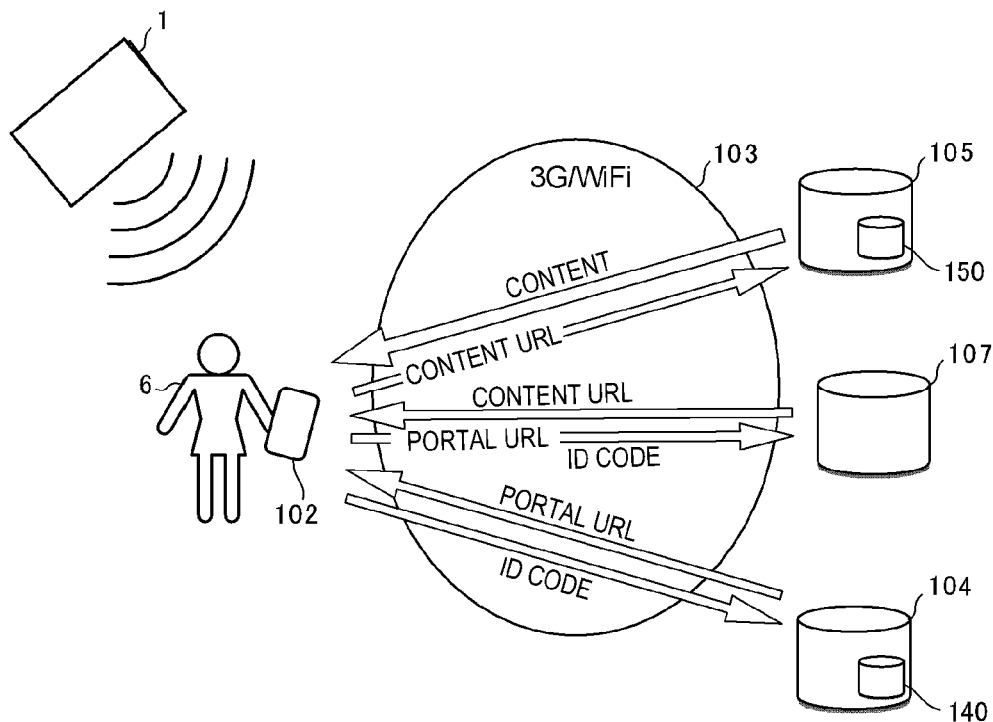
FIG. 11 is a block diagram illustrating another aspect of the information-providing system according to the second embodiment.
FIG. 12A is a diagram illustrating an example of an ID/URL association table of an ID resolution server according to the second embodiment.
FIG. 12B is a diagram illustrating an example of an ID/content association table of a content server according to the second embodiment.

In this instance, the ID resolution server 104 is preferably one, but the content server 105 may be separately provided for each company which displays a content. Further, as illustrated in FIG. 11, the portal URL may be separated from the content server 105, so that the portal server 107 is separately installed. The portal server 107 is a server designated by the portal URL and accessed by the portal terminal device 102. Further, the portal server 107 is a server tor providing an access distribution processing resource which replies to the portable terminal device 102 with the content URL according to the attached ID code at the time of the access.

In the above configuration according to the second embodiment, the ID resolution server 104 corresponds to an identification information resolution server. The portal URL corresponds to the first address information. The URL reaching the desired contents corresponds to the second address information. The portal server (content server 105 providing the portal URL) corresponds to the distribution server.

The method of superposing the sound signal on the sound ID or the application of the information-providing system is identical to that of the first embodiment. For example, the sound wave outputted from the television 1 is appropriately superposed with the sound ID corresponding to the service content to be provided in cooperation with the content of the program or CM. The sound ID is resolved by the URL for providing the desired service content, as described below. Accordingly if the user watches the television broadcast using the portable terminal device 102 carried by the user, the information-providing system can provide the user with a push-type service which induces the user to a specific Web page, without any complicated manipulation of the user.

To resolve the sound ID by the above-described URL, the ID resolution server 104 is provided with an ID/URL association table 140, as illustrated in FIG. 12A, and the portal server of the content server 105 is provided with an ID/content association table 150, as illustrated in FIG. 12B.

In FIG. 12A, the ID/URL association table 140 is memorized with a plurality of IDs and the portal URL of the content server 105 corresponding to the respective IDs. FIG. 12B shows the ID/content association table 150 installed in the content server 105 which is designated by a URL server 1 in the table of FIG. 12A. The ID/content association table 150 is memorized with ID codes, titles (program titles, brand names of CM products, or the like) indicating details of the contents, a type (coupon, information, stamp rally, or the like), and content URLs, which are associated with each other.

Since an example of the information-providing system applied to the television CM is substantially identical to that of the first embodiment, the detailed description will be omitted herein. In this instance, the URL searched by inputting the search word in a search site of Internet, and the content URL searched in the ID/content association table 150 may be identical to each other, or may not be.

FIG. 13 is a functional block diagram of which only portions associated with the second embodiment are extracted from the portable terminal device 102. The portable terminal device (smart phone) 102 includes a microphone 121, a control section 122, a network communication section 125, a GPS positioning section 126, a timer 127, an operation section 128, and a display section 129. The microphone 121 receives the sound wave outputted from the speaker device of the television 1, and converts it into a sound signal of an electric signal. The network communication section 125 is a function block for communicating with the ID resolution server 104 or the content server 105 via the information-communication network 108.

The control section 122 is provided with a sound ID processing section 123 and a Web browser 124 by cooperation of the application program. The sound ID processing section 128 has a processing section of demodulating the ID code by inputting the sound signal obtained from the microphone 121, which receives the sound, into a matched filter of which a coefficient is the diffusion code used for the diffusion modulation, and a processing section of communicating with the ID resolution server 104 and the content server 105 by controlling the network communication section 125. The demodulation process of the ID code is described in detail in the pamphlet of International Publication No. 2010/016589. The Web browser 124 accesses the URL acquired by the sound ID processing section 123 to display the Web page on a display (not illustrated).

The GPS positioning section (position acquiring section) 126 determines a position of itself (portable terminal device 102) using GPS, and inputs the position information about the determined position into the Web browser 124. Further, the timer (time acquiring section) 127 measures a time when the sound wave including the sound ID is received, or when it communicates with the ID resolution server 104, and inputs the time information about the measured time into the Web browser 124. The GPS positioning section 126 and the timer 127 are used in a modification which will be described later. Further, the operation section 128 is, for example, a touch panel, or a keypad, and detects an operation of the user 6, such as allowance for communication with the information-communication network. 103.

Figure 14:
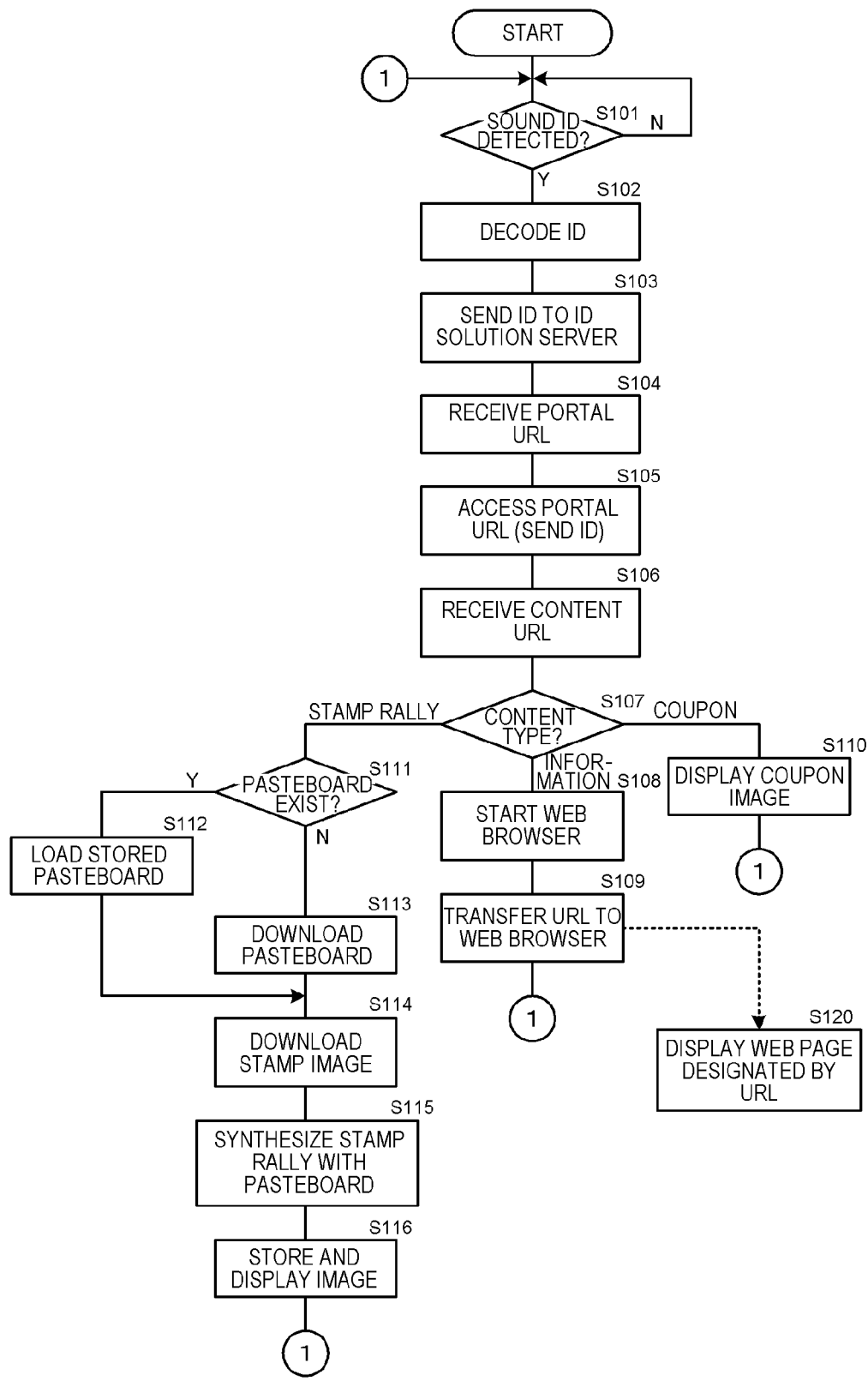
FIG. 14 is a flowchart illustrating an operation of the portable terminal device according to the second embodiment.

FIG. 14 is a flowchart illustrating the operation of the control section 122 of the portable terminal device 102. In the operation, the process of detecting the sound ID from the sound signal converted from the sound wave received by the microphone 121 is repeatedly performed at a predetermined time interval (step S101). The control section 122 is on standby while the sound ID is not detected (NO: in step S101). If the sound ID is detected (YES in step S101), the control section 122 demodulates it into the ID code (step S102), and automatically sends the demodulated ID code to the ID resolution server 104 (step S103). The ID resolution server 104 reads the portal URL of the content server 105 corresponding to the received ID code, and replies to the portable terminal device 102 with the read portal URL. If the portable terminal device 102 receives the portal URL in step S104, it accesses the received portal URL, and then again sends the ID code (step S105). The content server 105 sends a URL of the contents (coupon, information, or the like) according to the received ID code. Accordingly, the portable terminal device 102 receives the URL corresponding to the sent ID code (step S106).

The control section 122 performs the process according to the content type of the received URL (step S107). For example, in the case where the content type is the coupon, the control section 122 accesses the URL to display a coupon image (step S110). The coupon image is stored in the server as image data, not as the Web page. The sound ID processing section 123 downloads the image data using ftp or telnet to display it on the display (not illustrated). By employing the method, the security of the coupon having a function of marketable securities can be highly maintained, as compared with the case where it is registered in the Web page.

Further, if the content type is the information, the control section 122 starts the Web browser 124 of the portable terminal device 102 (step S108), transfers the received URL to the Web browser 124 (step S109), and then accesses the URL to display the Web page on the display (not illustrated) (step S120).

In addition, if the content type is the stamp rally, the control section 122 determines whether a pasteboard of the stamp rally has been already downloaded or not (step S111). If the pasteboard has been already downloaded and stored (YES in step S111), the control section 122 loads the stored pasteboard (step S112). If the pasteboard is not yet downloaded (NO in step S111), the control section 122 downloads the pasteboard from the content server 108 (step S113). The control section 122 downloads the stamp image which is the content in this time (step S114), and then synthesizes the stamp image on the pasteboard which has been already downloaded (step S115). The synthesized image is stored as the pasteboard, and simultaneously is displayed on the display section 129 (step S116). After the processes of steps S109, S110, and S116, it returns to step S101. By the above operation, the user 6 can acquire the coupon, a variety of information, and the stamp. In this instance, the content type received in step S106 can be determined by identification information of the content added to the URL, but can be determined based on the scheme of the URL. That is, if the scheme of the URL is the ftp or the telnet, the content type can be determined as the coupon, and if the URL is http, the content type can be determined as the information.

The flowchart in FIG. 14 includes the process of automatically accessing the desired URL to display the Web page when the sound ID is detected, but it may include a process of obtaining a permission of the user 6 and accessing the content server 105 when the access permission is obtained by the user 6. In this instance, the permission of the user 6 may be requested at any one or both prior to step S103 and step S105.

Further, in the case where one ID corresponds to the plurality of contents in the content server 106, the content server 105 may be provided with a table, as illustrated in FIG. 15A or 15B, as the ID/content association table 150.

FIGS. 15A and 15B are diagrams illustrating examples of the ID/content association table in the case where one sound ID corresponds to the plurality of contents. FIG. 15A shows an example of an ID/content association table 150A which associates one ID "0000" with four area-dependent contents (URLs) based on the position information. The position information is sent together with the ID code from the portable terminal device 102 to the content server 105. The portable terminal device 102 can correctly determine the position of the portable terminal device 102 by the GPS positioning section 126. The content server 105 determines that the portable terminal device 102 is positioned in any area, based on the position information received from the portable terminal device 102, and sends the URL of the contents according to the area.

In this instance, the position information can be acquired by a method different from the positioning by the GPS positioning section 126. For example, the position of the access point where the portable terminal device 102 accesses the information-communication network 103 can be acquired by the content server 105, and then it can be used as the position information.

In addition, FIG. 15B shows an example of an ID/content association table 150B which associates one ID "0000" with four time-of-day-dependent contents (URLs) based on the time Information. When the content server 105 receives the ID from the portable terminal device 102, the content server 105 determines that the time information belongs to any time of day, and sends the URL of the contents according to the time of day. FIG. 15B shows an example of the stamp rally, and provides a system of giving to the user 6 watching the program the stamp by broadcasting the sound ID for a long time program of 8 hours. In this instance, the system of the stamp rally can be applied to the area-dependent contents.

The time information is sent from the portable terminal device 102 to the content server 105, and the time when the content server 105 receives the access time from the portable terminal device 102 may be used as the time information. If the time information is sent to the content server 105 from the portable terminal device 102, the sending time may be used as the time information, or the time when the sound ID is received from the television 1 (sound output device) may be used as the time information.

Heretofore, it has been described the example of superposing the sound ID on the sound wave outputted from the television 1 but the sound output device is not limited to the television 1. For example, the sound output device may be a radio receiver. Further, as the sound output device, a speaker device installed in a facility, such as a retail store, may be used. As the facility it is not limited to a commercial facility, such as a store, but it can be applied to various facilities, such as a public facility, private facility, cluster housing, or an office facility.

For example, it may be applied to a system in which the sound ID is superposed with a touting sound of a background music outputted from the speaker device which is installed in front (vicinity) of the retail store or in the store, and a casual passer-by around/near the store or a customer entering the store is provided with a coupon or information, or with a stamp of stamp rally. For example, a device for outputting a sound in response to the supply of service is preferable. In this instance, since a range of the sound is generally shorter than a radio wave, the sound ID can be received only around/near the store provided with the speaker device 16. Accordingly, the coupon or information can be provided by limiting a recipient within an area which can be seen by relatively narrow eyes, such as a casual passer-by in front of the store or a customer entering the store.

Figure 8A:
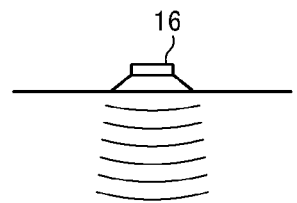
FIG. 8A is a diagram illustrating a first arrangement example of a speaker device in a case where the information-providing system is applied to a store.
Figure 8B:
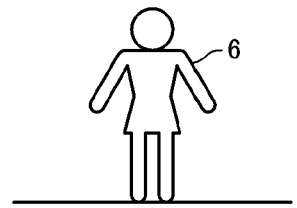
FIG. 8B is a diagram illustrating a second arrangement example of the speaker device in a case where the information-providing system is applied to the store.
Figure 8C:
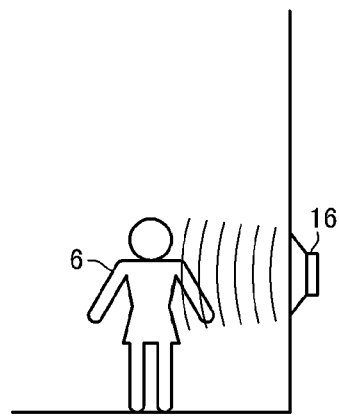
FIG. 8C is a diagram illustrating a third arrangement example of the speaker device in a case where the information-providing system is applied to the store.

In this instance, the speaker device 16 of the sound output device may be installed around/near the store or within the store in the same manner as that illustrated in FIGS. 8A to 8C. FIG. 8A shows an arrangement in which the speaker device 18 is installed at a passage or a ceiling of the store. FIG. 8B shows an arrangement in which the speaker device 16 is installed at a passage or a wall surface of the store. Further, FIG. 8C shows an arrangement in which a board 9 embedded with the speaker device 16 is installed in front of the store. However, the installing arrangement of the speaker device 16 is not limited thereto.

Figure 9:
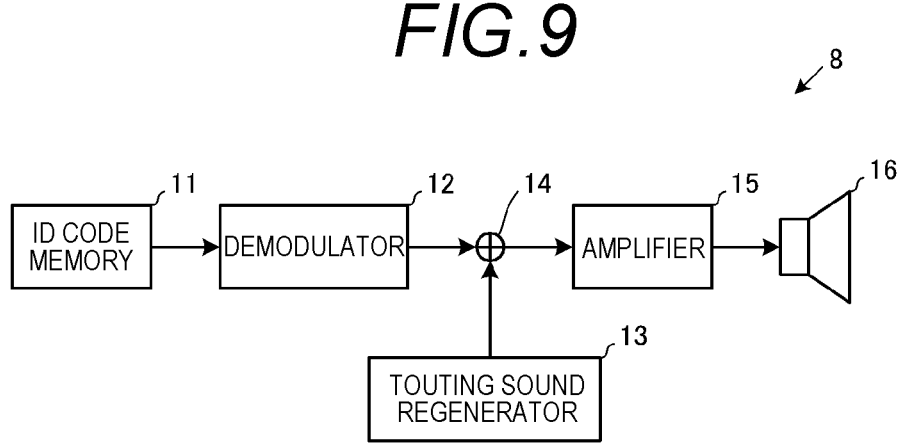
FIG. 9 is a diagram illustrating a configuration example of a sound output device.

The sound output device a including the speaker 16 in FIGS. 8A to 8C is configured as illustrated in FIG. 9. The sound output device 8 includes an ID code memory 11, a demodulator 12, a touting sound regenerator 13, a synthesizing unit 14, an amplifier 15, and the speaker device 16. The ID code memory 11 is memorized with ID codes corresponding to desired contents (URLs or coupons). The demodulator 12 is a processing unit for reading the ID code from the ID code memory 11, and demodulating it into a signal (sound ID) of a frequency hand which can be output as a sound wave which is aerial vibration to output the signal. A demodulation method of the demodulator 12 can employ various types. In this embodiment, however, to improve noise resistance, the diffusion code is phase-modulated to the ID code, and the phase-modulated diffusion code is converted into a signal, of which a frequency is shifted to a band in the vicinity of the upper limit of an audible band or an inaudible band, so that the converted signal is outputted. This technique is described in detail in the international patent application (Pamphlet No. 2010/016589) assigned to the applicant/assignee.

The touting sound regenerator 13 is a function block for generating a sound signal to be heard by the user. The sound signal to be heard by the user is a signal of an audible band such as a sound announcing a shop name or the like, or music like a CM song. The synthesizing unit 14 is a function unit for additively synthesizing the signal of the sound ID inputted from the demodulator 12 and the sound signal inputted from the touting sound regenerator 13. The amplifier 15 amplifies the sound signal inputted from the synthesizing unit 14 by appropriate electric power to supply it to the speaker device 16. The speaker device 16 outputs the sound signal inputted from the amplifier 15 as the sound wave. Herein, the output power of the amplifier 15 is power capable of allowing the sound wave to arrive at a coverage area of the sound output device 8 and not allowing the sound wave to arrive at an area beyond the coverage area, and may be appropriately set depending upon an extent of an installed place or a degree of noise.

In each embodiment, the smart phone is illustrated as the portable terminal devices 2 and 102, hut the portable terminal devices 2 and 102 are not limited to the smart phone. For example, the portable terminal devices 2 and 102 according to the respective embodiments can be applied to various portable terminal devices, such as a cellular phone or a tablet terminal, a FDA (Personal Digital Assistant), a mobile computer, or a game console.

The sound ID processing section 22 of the portable terminal device 2 according to the first embodiment or the sound ID processing section 123 of the portable terminal device 102 according to the second embodiment is a function block which is realized by the cooperation of the control section and the program, and the program can be provided in a state which is recorded in a computer-readable recording medium. The computer-readable recording medium can include a magnetic recording medium (e.g., a magnetic tape or magnetic disc (HDD or FD)), an optical recording medium (e.g., optical disc (CD or DVD)), a magnet-optical recording medium, and a semiconductor memory. Further, the above-described program can be downloaded via a information-communication network such as Internet.

In each embodiment, it has been described the system including the speaker device as the sound output device and the microphone as the sound receiving device (portable terminal device), and transmitting the sound wave superposed with the sound ID through air as a medium. However, the present invention can be applied to a system which transmits the sound wave through a solid or liquid as a medium. That is, in the present invention, the sound or the sound wave includes all elastic waves capable of being propagated through an elastic body irrespective of air, liquid and solid, as well as the elastic wave capable of being propagated through the air. In addition, the sound output includes exciting the solid or the liquid, as well as exciting the air, and the sound reception includes detecting vibration of the solid or the liquid, as well as detecting (converting it into an electric signal) vibration of the air.

If the medium is the solid or the liquid, the sound output device includes an oscillator for applying vibration to the solid or the liquid, instead of the speaker device, and the sound receiving device includes a pickup for detecting the vibration of the solid or the liquid which is the medium, instead of the microphone. Even though the sound output device and the sound receiving device are configured as described above, if the sound wave superposed with the sound ID is transmitted through the solid or the liquid as the medium, the sound receiving device (portable terminal device) can extract the sound ID from the sound wave (sound signal), and can carry out various processes using the identification information obtained from the sound ID.

The present application is based on Japanese Patent Application No. 2011-001765 filed on Jan. 7, 2011 and Japanese Patent Application No. 2011-083977 filed on April 5, the contents of which are incorporated herein by reference.

REFERENCE SIGNS LIST

1: television (sound output device)
2, 102: portable terminal device (smart phone)
3, 103: information-communication network
4, 104: ID resolution server
5, 105: content server
6: user
107: portal server
8: sound output device
16: speaker device
40, 140: ID/URL association table
50, 150: ID/content association table

The invention claimed is:

1. An information-providing system comprising:
a sound output device adapted to output, as a sound wave, identifying information which is modulated into a sound signal;
an identifying-information resolution server connected to an information-communication network, and adapted to identify address information for accessing a content server which is connected to the information-communication network, based on the identifying information, and send the address information; and
a portable terminal device that includes a sound receiving section adapted to receive the sound wave outputted from the sound output device, a demodulating section adapted to demodulate the identifying information from the received sound wave, a resolution section adapted to send the demodulated identifying information to the identifying-information resolution server and receive the address information from the identifying-information resolution server, and an access section adapted to access the content server using the address information acquired, wherein
the address information includes a URL for accessing the content server,
the identifying information does not include the address information,
the identifying-information resolution server identifies the address information by associating the address information with the identifying information, and
the identifying-information resolution server includes an association section that associates identifying information with address information including a URL for each of a plurality of time of day ranges, in which a first URL is associated with first identifying information in a first time of day range and a second URL is associated with the first identifying information in a second time of day range that is different from the first time of day range,
wherein
the portable terminal device further includes a position acquiring section adapted to acquire position information which indicates a position of the portable terminal device,
the identifying-information resolution server is configured to identify the address information based on the identifying information and the position information sent from the portable terminal device, and
the resolution section of the portable terminal device sends the identifying information demodulated by the demodulation section and the position information acquired by the position acquiring section to the identifying-information resolution server to acquire the address information.

2. The information-providing system according to claim 1, wherein
the portable terminal device further includes a time acquiring section adapted to acquire time information, wherein the time information indicates a time when the sound receiving section receives the sound wave outputted by the sound output device, or a time when the identifying information is sent to the identifying-information resolution server,
the identifying-information resolution server is a server adapted to identify the address information based on the identifying information and the time information sent from the portable terminal device, and
the resolution section of the portable terminal device sends the demodulated identifying information and the time information acquired by the time acquiring section to the identifying-information resolution server to acquire the address information.

3. The information-providing system according to claim 1, wherein
the sound output device is a broadcast receiving device,
the sound wave outputted from the sound output device includes a sound sent from a broadcasting station, the sound being a sound of a program or advertisement of a broadcast, and
the identifying-information resolution server identifies the address information for accessing the content server having a content about the program or advertisement of the broadcast based on the received identifying information.

4. The information-providing system according to claim 1, wherein
the sound output device includes a speaker device installed inside, outside or in a vicinity of a facility, and
the identifying-information resolution server identifies the address information for accessing the content server having a content about the facility based on the received identifying information.

5. A server, the server comprising:
a receiving section adapted to communicate with a portable terminal device, which demodulates identifying information from a received sound wave, via an information-communication network, and to receive the identifying information from the portable terminal device; and
a resolution section adapted to identify address information for accessing a content server connected to the information-communication network based on the received identifying information, and send the address information, wherein
the address information includes a URL for accessing the content server,
the identifying information does not include the address information, and
the resolution section identifies the address information by associating the address information with the identifying information;
the server further comprising:
an association section that associates identifying information with address information including a URL for each of a plurality of time of day ranges, in which a first URL is associated with first identifying information in a first time of day range and a second URL is associated with the first identifying information in a second time of day range that is different from the first time of day range,
wherein
the portable terminal device acquires position information which indicates a position of the portable terminal device,
the resolution section is configured to identify the address information based on the identifying information and the position information sent from the portable terminal device, and
the portable terminal device sends the identifying information and the position information to the receiving section to acquire the address information.

6. A non-transitory computer-readable medium in which is stored a program capable of causing a computer to function as:
demodulation means for demodulating identifying information from a received sound wave;
identifying-information resolution means for sending the demodulated identifying information to an identifying-information resolution server via a information-communication network and receive address information of a content server connected to the information-communication network from the identifying-information resolution server; and
network access means for accessing the content server via the information-communication network using the address information acquired, wherein
the address information includes a URL for accessing the content server,
the identifying information does not include the address information,
the identifying-information resolution server identifies the address information by associating the address information with the identifying information, and
the program further causes the computer to function as:
an association section that associates identifying information with address information including an URL for each of a plurality of time of day ranges, in which a first URL is associated with first identifying information in a first time of day range and a second URL is associated with the first identifying information in a second time of day range that is different from the first time of day range,
wherein
the program further causes the computer to function as position acquiring means for acquiring position information which indicates a position of the computer,
the identifying-information resolution server is configured to identify the address information based on the identifying information and the position information sent from the computer, and
the identifying-information resolution means sends the identifying information and the position information to the identifying-information resolution server to acquire the address information.

7. An information-providing system comprising:
a sound output device adapted to output, as a sound wave, identifying information which is modulated into a sound signal;
an identifying-information resolution server connected to an information-communication network, and adapted to identify first address information for accessing a distribution server which is connected to the information-communication network, based on the identifying information, and send the first address information;
the distribution server connected to the information-communication network, identified by the first address information, and adapted to identify second address information for accessing a content server, having a desired content, which is connected to the information-communication network, based on the first address information, and send the second address information; and
a portable terminal device that includes a sound receiving section adapted to receive the sound wave outputted from the sound output device, a demodulating section adapted to demodulate the identifying information from the received sound wave, a network communication section adapted to communicate via the information-communication network, and a control section adapted to send the demodulated identifying information to the identifying-information resolution server and receives the first address information from the identifying-information resolution server, to access the distribution server using the first address information acquired, to send the identifying information to the distribution server and receive the second address information from the distribution server, and to access the content server using the second address information acquired, wherein
the first address information includes a URL for accessing the distribution server,
the identifying information does not include the first address information,
the identifying-information resolution server identifies the first address information by associating the first address information with the identifying information, and
the distribution server includes an association section that associates identifying information with address information including a URL for each of a plurality of time of day ranges, in which a first URL is associated with first identifying information in a first time of day range and a second URL is associated with the first identifying information in a second time of day range that is different from the first time of day range, wherein
the portable terminal device further includes a position acquiring section adapted to acquire position information which indicates a position of the portable terminal device,
the distribution server is configured to identify the second address information based on the identifying information and the position information sent from the portable terminal device, and
the control section of the portable terminal device sends the identifying information and the position information acquired by the position acquiring section to the distribution server to acquire the second address information.

8. The information-providing system according to claim 7, wherein
the identifying-information resolution server associates one first address information with pieces of identifying information, and
the distribution server which is accessed with the one first address information associates different pieces of second address information with the pieces of identifying information.

9. The information-providing system according to claim 7, wherein
the distribution server and the content server which is accessed with the second address information identified by the distribution server are configured by a common server.

10. The information-providing system according to claim 7, wherein
the sound output device is a broadcast receiving device,
the sound wave outputted from the sound output device includes a sound sent from a broadcasting station, the sound being a sound of a program or advertisement of a broadcast, and
the distribution server identifies the second address information for accessing the content server having a content about the program or advertisement of the broadcast based on the received identifying information.

11. The information-providing system according to claim 7, wherein
the sound output device includes a speaker device installed inside, outside or in a vicinity of a facility, and
the distribution server identifies the second address information for accessing the content server having a content about the facility based on the received identifying information.

12. The information-providing system according to claim 7, wherein
the portable terminal device further includes a time acquiring section adapted to acquire time information, wherein the time information indicates a time when the sound receiving section receives the sound wave outputted by the sound output device, or a time when the identifying information is sent to the distribution server,
the distribution server is configured to identify the second address information based on the identifying information and the time information sent from the portable terminal device, and
the control section of the portable terminal device sends the identifying information and the time information acquired by the time acquiring section to the distribution server to acquire the second address information.

13. A server for distribution, comprising:
a receiving section adapted to communicate with a portable terminal device, which demodulates identifying information from a received sound wave, via an information-communication network, and to receive the identifying information from the portable terminal device; and
a distribution section adapted to identify second address information for accessing a content server having a desired content and being connected to the information-communication network based on the received identifying information, and send the second address information, wherein
the second address information includes a URL for accessing the content server,
the identifying information does not include the second address information,
the distribution section identifies the address information by associating the second address information with the identifying information, and
the server for distribution further includes an association section that associates identifying information with address information including a URL for each of a plurality of time of day ranges, in which a first URL is associated with first identifying information in a first time of day range and a second URL is associated with the first identifying information in a second time of day range that is different from the first time of day range, wherein
the portable terminal device acquires position information which indicates a position of the portable terminal device,
the distribution section is configured to identify the second address information based on the identifying information and the position information sent from the portable terminal device, and
the portable terminal device sends the identifying information and the position information to the distribution section to acquire the second address information.

* * * * *